(12) United States Patent
Mochizuki

(10) Patent No.: US 11,508,036 B2
(45) Date of Patent: Nov. 22, 2022

(54) IMAGE PROCESSING APPARATUS AND IMAGE PROCESSING METHOD FOR DECODING RAW IMAGE DATA ENCODED WITH LOSSY ENCODING SCHEME

(71) Applicant: CANON KABUSHIKI KAISHA, Tokyo (JP)

(72) Inventor: Shigeki Mochizuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 73 days.

(21) Appl. No.: 17/078,650

(22) Filed: Oct. 23, 2020

(65) Prior Publication Data
US 2021/0125309 A1 Apr. 29, 2021

(30) Foreign Application Priority Data

Oct. 25, 2019 (JP) .............................. JP2019-194728

(51) Int. Cl.
| | |
|---|---|
| *H04N 19/00* | (2014.01) |
| *G06T 5/00* | (2006.01) |
| *H04N 19/14* | (2014.01) |
| *H04N 19/169* | (2014.01) |
| *G06T 5/50* | (2006.01) |
| *H04N 19/124* | (2014.01) |
| *H04N 19/85* | (2014.01) |

(52) U.S. Cl.
CPC .............. *G06T 5/001* (2013.01); *G06T 5/50* (2013.01); *H04N 19/124* (2014.11); *H04N 19/14* (2014.11); *H04N 19/1883* (2014.11); *H04N 19/85* (2014.11); *G06T 2207/20084* (2013.01); *G06T 2207/20221* (2013.01)

(58) Field of Classification Search
CPC .. H04N 19/124; H04N 19/115; H04N 19/126; H04N 19/136; H04N 19/14; H04N 19/169; H04N 19/186; H04N 19/30; H04N 19/85; H04N 5/232; H04N 5/367; H04N 9/097; G06T 5/00; G06T 5/50
See application file for complete search history.

(56) References Cited

U.S. PATENT DOCUMENTS

| | | | |
|---|---|---|---|
| 6,678,421 B1* | 1/2004 | Daniell ................ | H04N 19/647 382/238 |
| 2011/0268182 A1* | 11/2011 | Joshi ...................... | H04N 19/48 375/240.03 |
| 2016/0379340 A1* | 12/2016 | Lai ........................ | G06K 9/4661 382/163 |
| 2017/0359579 A1* | 12/2017 | Miyauchi ........... | H04N 19/1883 |

FOREIGN PATENT DOCUMENTS

JP 2019-004428 A 1/2019

* cited by examiner

*Primary Examiner* — Li Liu
(74) *Attorney, Agent, or Firm* — Cowan, Liebowitz & Latman, P.C.

(57) ABSTRACT

An image processing apparatus decodes encoded RAW data that includes subband data being encoded with lossy encoding scheme, and determines one of a plurality of classifications based on the decoded subband data, wherein the plurality of classifications are based on a feature of an image. The apparatus also obtains correction data corresponding to the determined classification, and corrects recomposed data, which is obtained by applying frequency recomposition to the decoded subband data, based on the correction data, in order to obtain the corrected data as decoded RAW data.

10 Claims, 12 Drawing Sheets

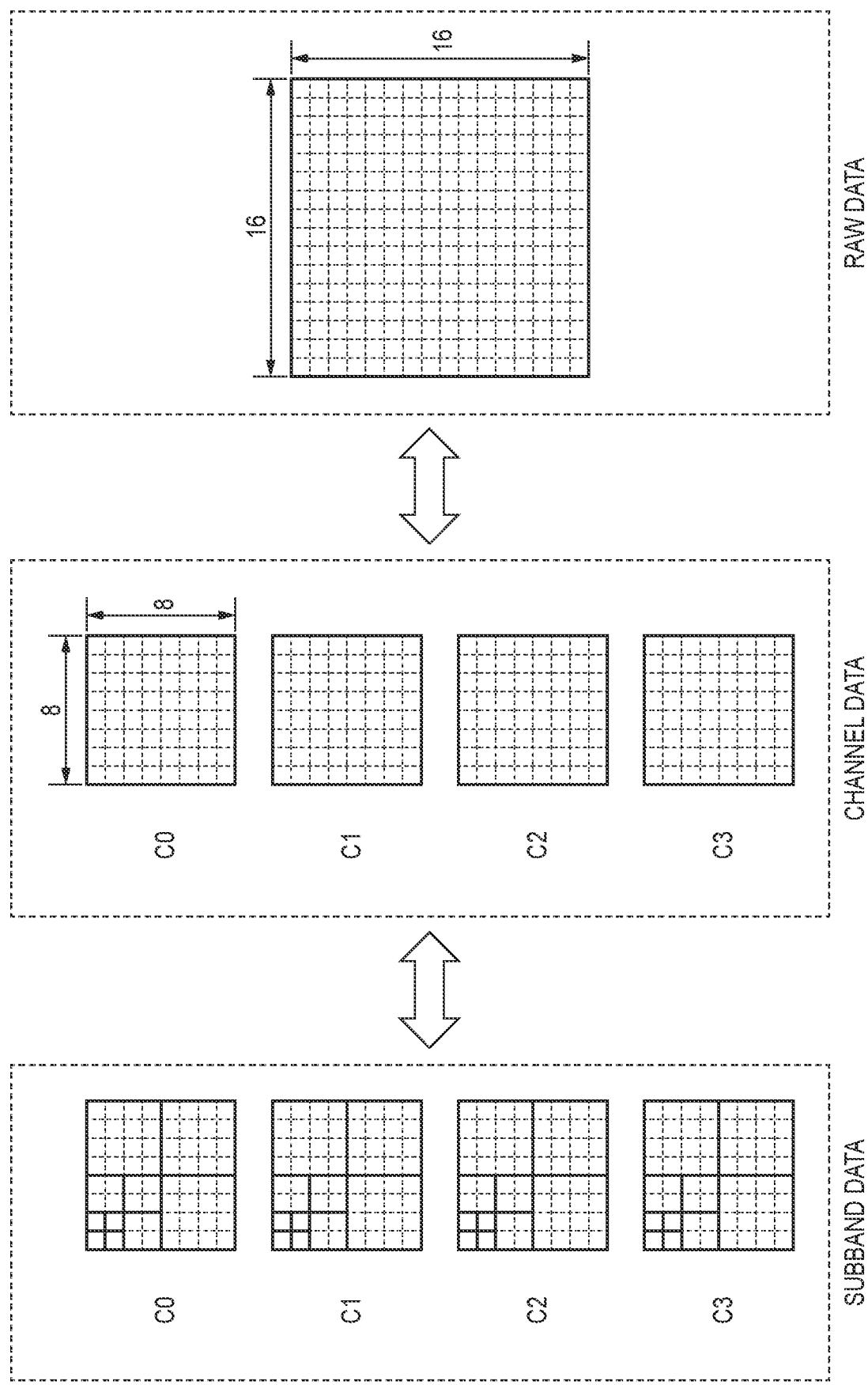

F I G. 10A
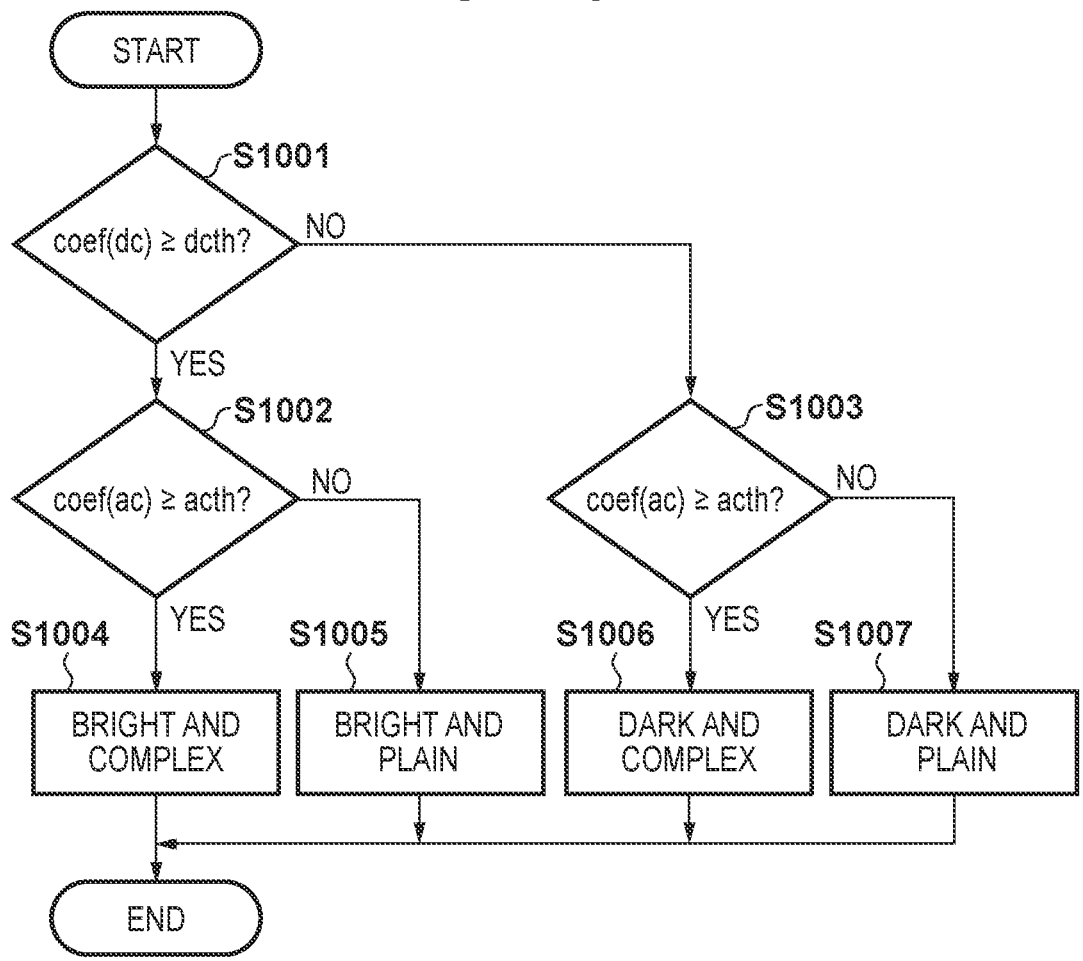
F I G. 10B
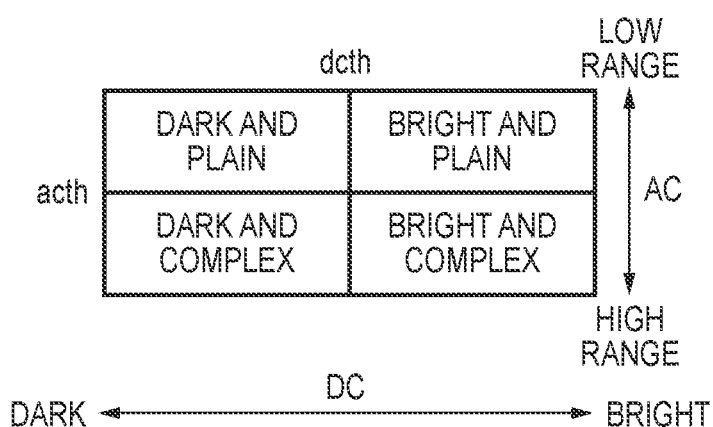

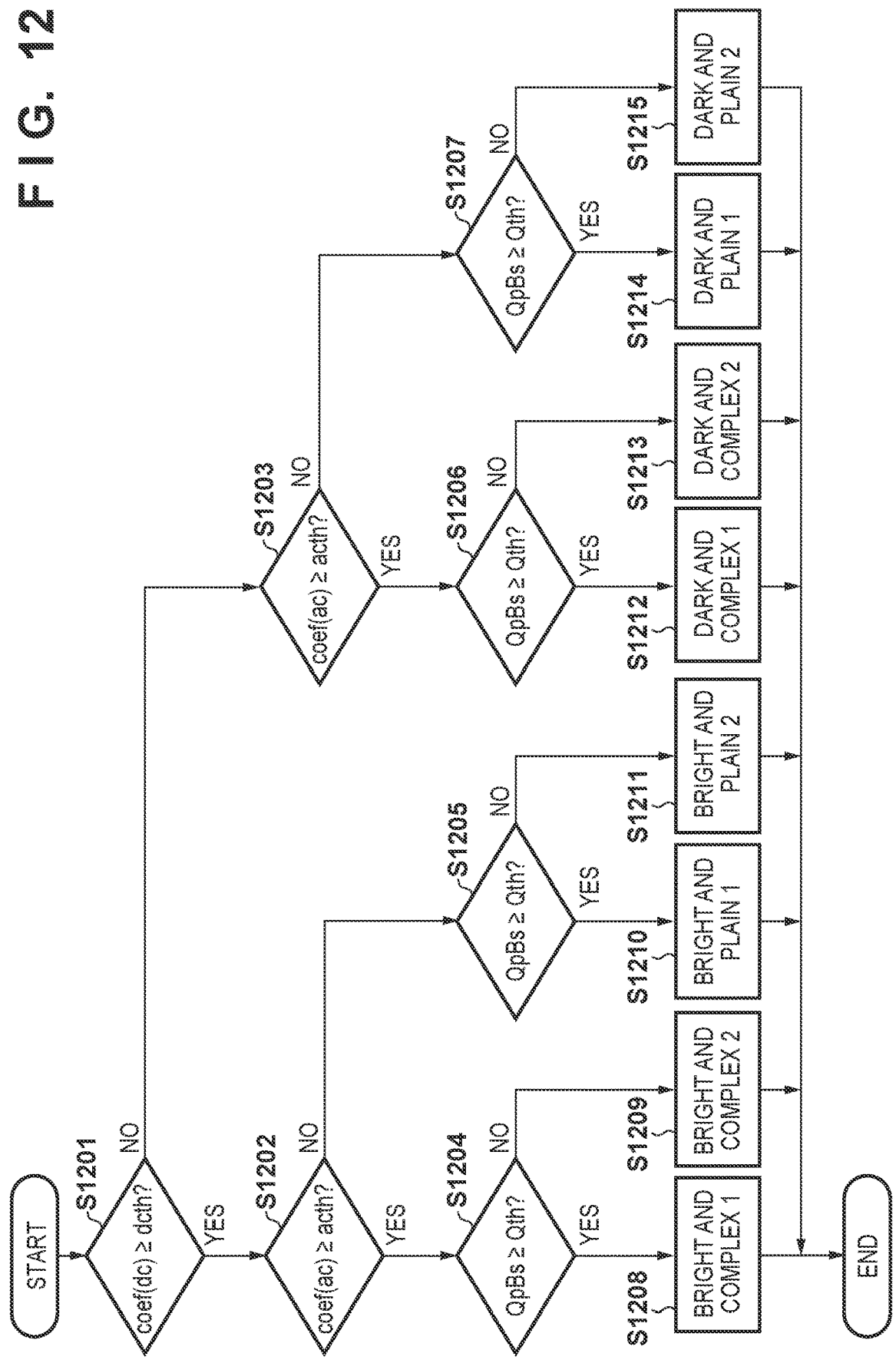

IMAGE PROCESSING APPARATUS AND IMAGE PROCESSING METHOD FOR DECODING RAW IMAGE DATA ENCODED WITH LOSSY ENCODING SCHEME

BACKGROUND OF THE INVENTION

Field of the Invention

The present invention relates to an image processing apparatus and an image processing method, and in particular relates to a technique for decoding encoded image data.

Description of the Related Art

A color filter array (also referred to as "CFA") is provided in a single-plate color image sensor that is widely used in digital cameras. Filters of a plurality of predetermined colors are regularly arranged in the color filter array. There are various color combinations and arrangement methods for the color filter array, but the primary-color Bayer filter shown in FIG. 2 is representative.

In the primary-color Bayer filter, unit filters of R (red), G1 (green), G2 (green), and B (blue) are cyclically arranged in units of 2×2. One unit filter is provided for each pixel of an image sensor, and thus pixel data that constitutes image data obtained in one instance of shooting includes only information of one color component of RGB. Image data in this state is called RAW image data.

RAW image data is not suitable for display as is. Therefore, usually, various types of image processing are applied so as to convert RAW image data into a format that can be displayed by a general-purpose device (for example, the JPEG format or the MPEG format), and the data is then recorded. However, such a conversion often includes lossy image processing that may degrade image quality, in order to reduce the data amount, for example. Accordingly, some digital cameras have a function to record RAW image data to which the conversion has not been applied.

Data amounts of RAW image data have become very large as the number of pixels of an image sensor increases. Therefore, recording RAW image data after reducing (compressing) the data amount in order to improve the continuous shooting speed, save the capacity of the recording medium, and the like has also been proposed (Japanese Patent Laid-Open No. 2019-4428).

In Japanese Patent Laid-Open No. 2019-4428, lossy encoding that includes quantization processing is applied in order to increase the compression efficiency of a data amount. When RAW image data to which lossy encoding has been applied is decoded, and then image processing is applied to convert the image data into a general-purpose format, it is easier to visually recognize deterioration in the image quality caused by a quantization error, especially in regions of which brightness is low and flat (i.e., having small variation).

SUMMARY OF THE INVENTION

Conventionally, there has not been proposed a decoding method for RAW data that have been encoded with a lossy encoding scheme, that is capable of reducing image quality deterioration that will be occurred in an image obtained through image processing applied after the decoding. According to one aspect of the present invention, there are provided an image processing apparatus and an image processing method that are capable of decoding RAW image data that has been encoded with a lossy encoding scheme, so as to suppress image quality deterioration in an image to be obtained after being decoded.

According to an aspect of the present invention, there is provided an image processing apparatus comprising: one or more processors that execute a program comprising instructions that cause, when executed by the one or more processors, the one or more processors to function as: a decoding unit configured to decode encoded RAW data that includes subband data being encoded with lossy encoding scheme; a determination unit configured to determine one of a plurality of classifications based on the decoded subband data, the plurality of classifications being based on a feature of an image; an obtaining unit configured to obtain correction data corresponding to the determined classification; and a correction unit configured to correct recomposed data, which is obtained by applying frequency recomposition to the decoded subband data, based on the correction data, in order to obtain the corrected data as decoded RAW data.

According to another aspect of the present invention, there is provided an image processing method that is executed by an image processing apparatus, the method comprising: decoding encoded RAW data that includes subband data being encoded with lossy encoding scheme; determining one of a plurality of classifications based on the decoded subband data, the plurality of classifications being based on a feature of an image; obtaining correction data corresponding to the determined classification; and correcting recomposed data, which is obtained by applying frequency recomposition to the decoded subband data, based on the correction data, in order to obtain the corrected data as decoded RAW data.

According to a further aspect of the present invention, there is provided a non-transitory computer-readable medium that stores a program for causing a computer to function as an image processing apparatus comprising: a decoding unit configured to decode encoded RAW data that includes subband data being encoded with lossy encoding scheme; a determination unit configured to determine one of a plurality of classifications based on the decoded subband data, the plurality of classifications being based on a feature of an image; an obtaining unit configured to obtain correction data corresponding to the determined classification; and a correction unit configured to correct recomposed data, which is obtained by applying frequency recomposition to the decoded subband data, based on the correction data, in order to obtain the corrected data as decoded RAW data.

Further features of the present invention will become apparent from the following description of exemplary embodiments (with reference to the attached drawings).

BRIEF DESCRIPTION OF THE DRAWINGS

FIG. 7 is a diagram showing an example of quantization control units related to image quality control according to an embodiment of the present invention.

FIGS. 10A and 10B are a flowchart and a diagram related to operations of a feature determination unit according to a first embodiment.

FIG. 12 is a flowchart related to operations of the feature determination unit according to the first embodiment.

DESCRIPTION OF THE EMBODIMENTS

Figure 1:
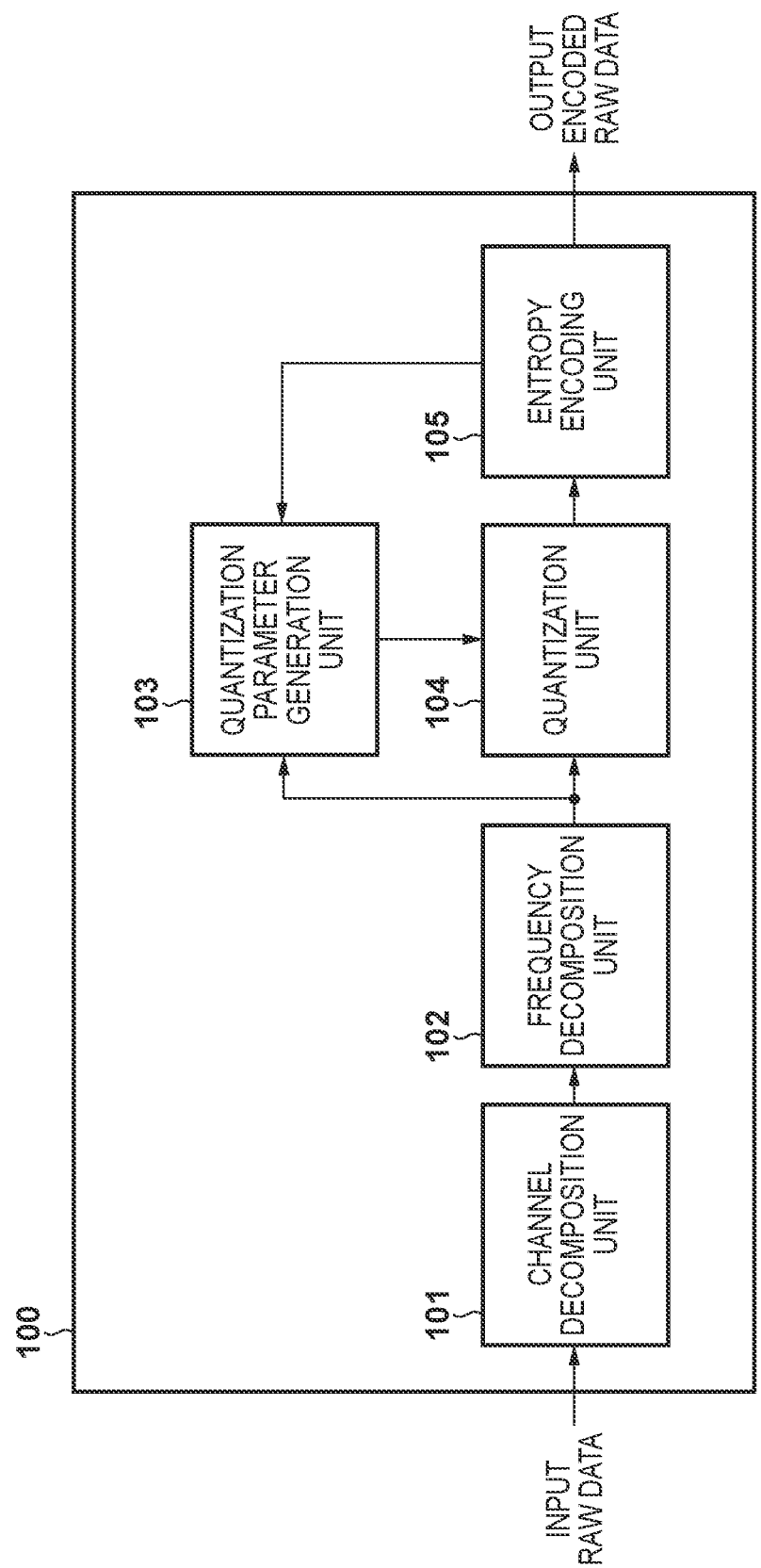
FIG. 1 is a block diagram showing a configuration example of an encoding apparatus that generates encoded RAW data to be decoded by a decoding apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Note that an encoding apparatus and a decoding apparatus to be described in embodiments below can be realized in an electronic device that can process image data. Examples of such an electronic device include a digital camera, a computer device (personal computer, tablet computer, media player, PDA, etc.), a mobile phone, a smart phone, a gaming device, a robot, a drone, and a drive recorder. These are exemplary, and the present invention is also applicable to other electronic devices.

First Embodiment

Description of Encoding Apparatus

First, an encoding apparatus that generates encoded data to be decoded by a decoding apparatus according to an embodiment will be described with reference to the block diagram shown in FIG. 1. Note that, according to this embodiment, the primary-color Bayer array color filter is provided in an image sensor, but the present invention does not depend on a type of color filter.

An encoding apparatus 100 includes a channel decomposition unit 101, a frequency decomposition unit 102, a quantization parameter generation unit 103, a quantization unit 104, and an entropy encoding unit 105. These units can be implemented by a dedicated hardware circuit such as an ASIC, or as a result of a general-purpose processor such as a DSP or a CPU executing a program.

Figure 2:
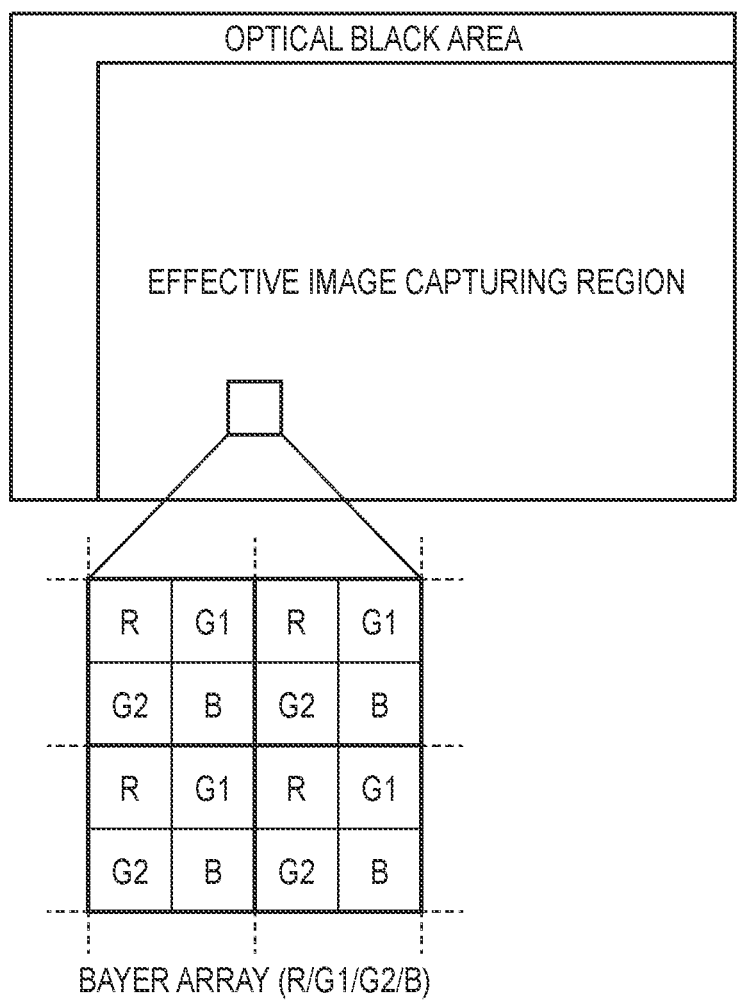
FIG. 2 is a schematic diagram related to RAW data in the Bayer array.

Image data (RAW data) read out from an image sensor that includes the primary-color Bayer array color filter shown in FIG. 2 is input to the encoding apparatus 100. Here, A/D conversion is applied to the image data within the image sensor, or to the image after being read out from the image sensor, and the RAW data in a digital format is input.

Figure 3A:
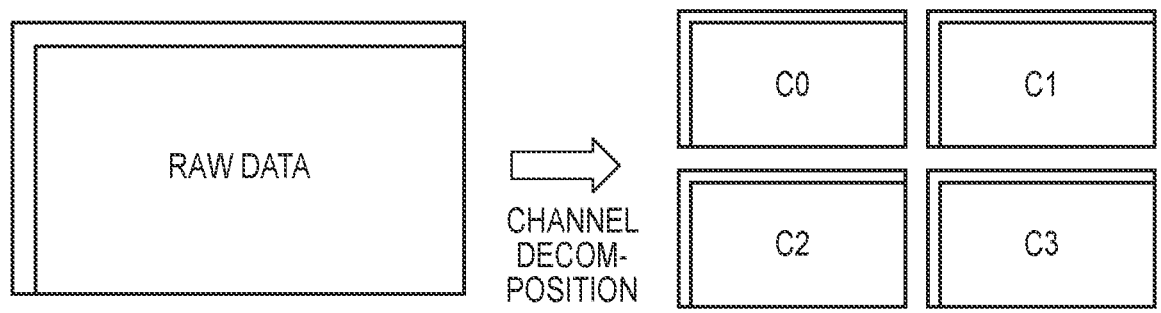
FIGS. 3A to 3C are diagrams showing examples of channel decomposition according to an embodiment of the present invention.
Figure 3B:
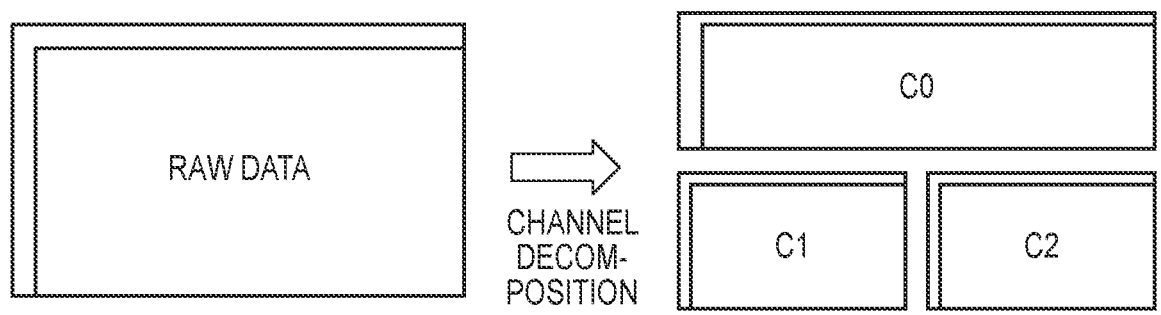
Figure 3C:
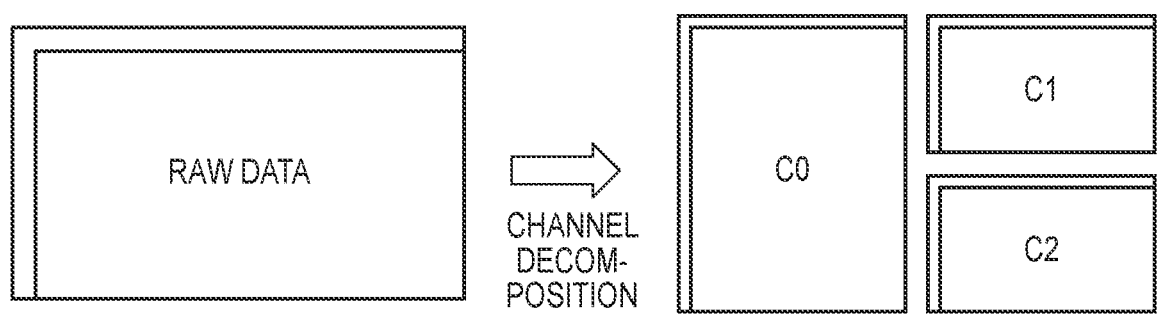

The channel decomposition unit 101 decomposes RAW data into a plurality of data groups (channels). FIGS. 3A to 3C schematically show examples of decomposition that is performed by the channel decomposition unit 101. For example, in the Bayer array, four channels, namely R, G1, G2, and B can be generated as a result of performing decomposition such that pixels having the same type of filter form one channel. Alternatively, C0 to C3 obtained using Expression 1 below may be generated as channels, in units of repetition of R, G1, G2, and B (FIG. 3A).

$$C0 = a + c$$

$$C1 = B - G2$$

$$C2 = R - G1$$

$$C3 = b - a \qquad (1)$$

Note that $a = G2 + [C1/2]$, $b = G1 + [C2/2]$, and $c = [C3/2]$, where [ ] indicates a floor function, and [x] is a maximum integer that does not exceed x.

Note that, as shown in FIGS. 3B and 3C, a configuration may also be adopted in which R and G1 or G2 are grouped into one channel, and data is decomposed into three channels. These are exemplary, and another number of channels after decomposition and another decomposition method may also be adopted.

The frequency decomposition unit 102 applies discrete wavelet transform at a predetermined decomposition level (hereinafter, referred to as "lev") for each channel, and divides data into subband data. The frequency decomposition unit 102 outputs the obtained subband data (transform coefficients) to the quantization parameter generation unit 103 and the quantization unit 104.

Figure 4A:
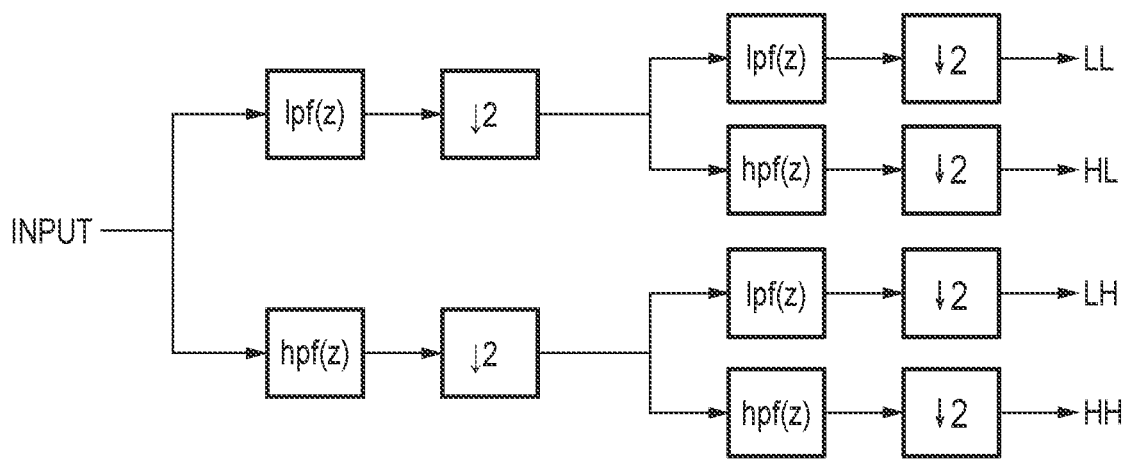
FIGS. 4A to 4C are diagrams showing examples of frequency decomposition (subband division) according to an embodiment of the present invention.

FIG. 4A shows a configuration of a filter bank for realizing discrete wavelet transform at lev=1, and lpf (z) denotes a low-pass filter, hpf (z) denotes a high pass filter, and ↓ denotes 2:1 downsampling. Transfer functions of lpf (z) and hpf (z) are as follows.

$$\mathrm{lpf}(z) = (-z^{-2} + 2z^{-1} + 6 + 2z^{1} - z^{2})/8 \qquad (2)$$

$$\mathrm{hpf}(z) = (-z^{-1} + 2 - z^{1})/2 \qquad (3)$$

Two-dimensional discrete wavelet transform can be realized by performing processing in the vertical direction at the first stage and in the horizontal direction at the second stage.

Figure 4B:
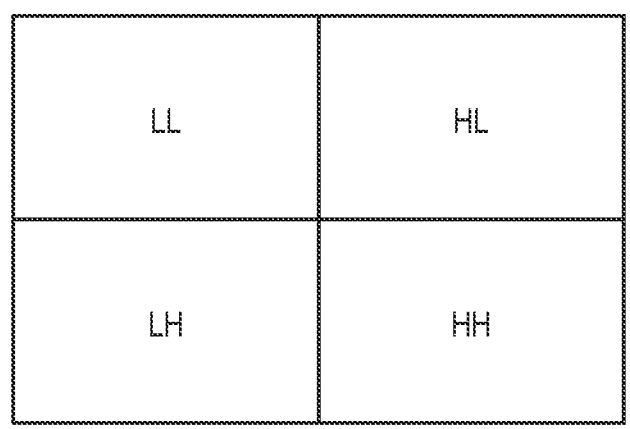
Figure 4C:
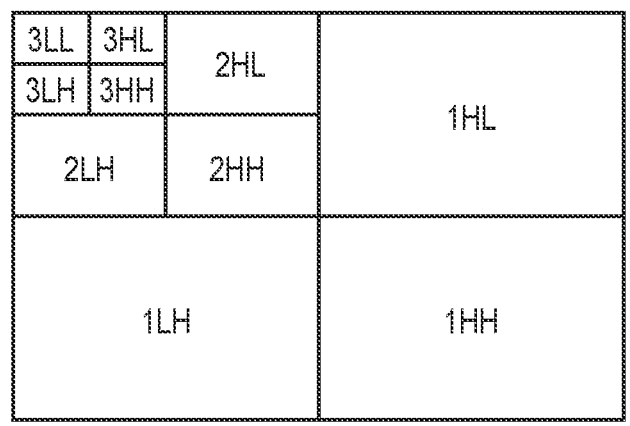

As a result of applying the filter bank in FIG. 4A, data of each channel is divided into one piece of low-frequency subband (LL) data and three pieces of high-frequency subband (HL, LH, HH) data as shown in FIG. 4B. If the breakdown level (lev) is higher than 1, the filter bank is repeatedly applied to the low-frequency subband (LL) data. For example, if lev=3, each channel data is divided into 10 pieces of subband (3LL to 1HH) data, as shown in FIG. 4C. Note that, here, discrete wavelet transform is made up of 5-tap lpf (z) and 3-tap hpf (z) as indicated by Expressions 1 and 2, but filters with a different number of taps and a different coefficient may also be used.

The quantization parameter generation unit 103 generates a quantization parameter to be used for quantization processing of subband data (transform coefficients) generated by the frequency decomposition unit 102. The quantization parameter generation unit 103 generates a quantization parameter (QpBr) common to each unit region for controlling a code amount, based on a target code amount obtained from a compression rate (reduction rate) of a data amount set in advance. Note that a known method can be used as a method for controlling a code amount based on the target code amount, and thus, here, a detailed description thereof is omitted.

Figure 5:
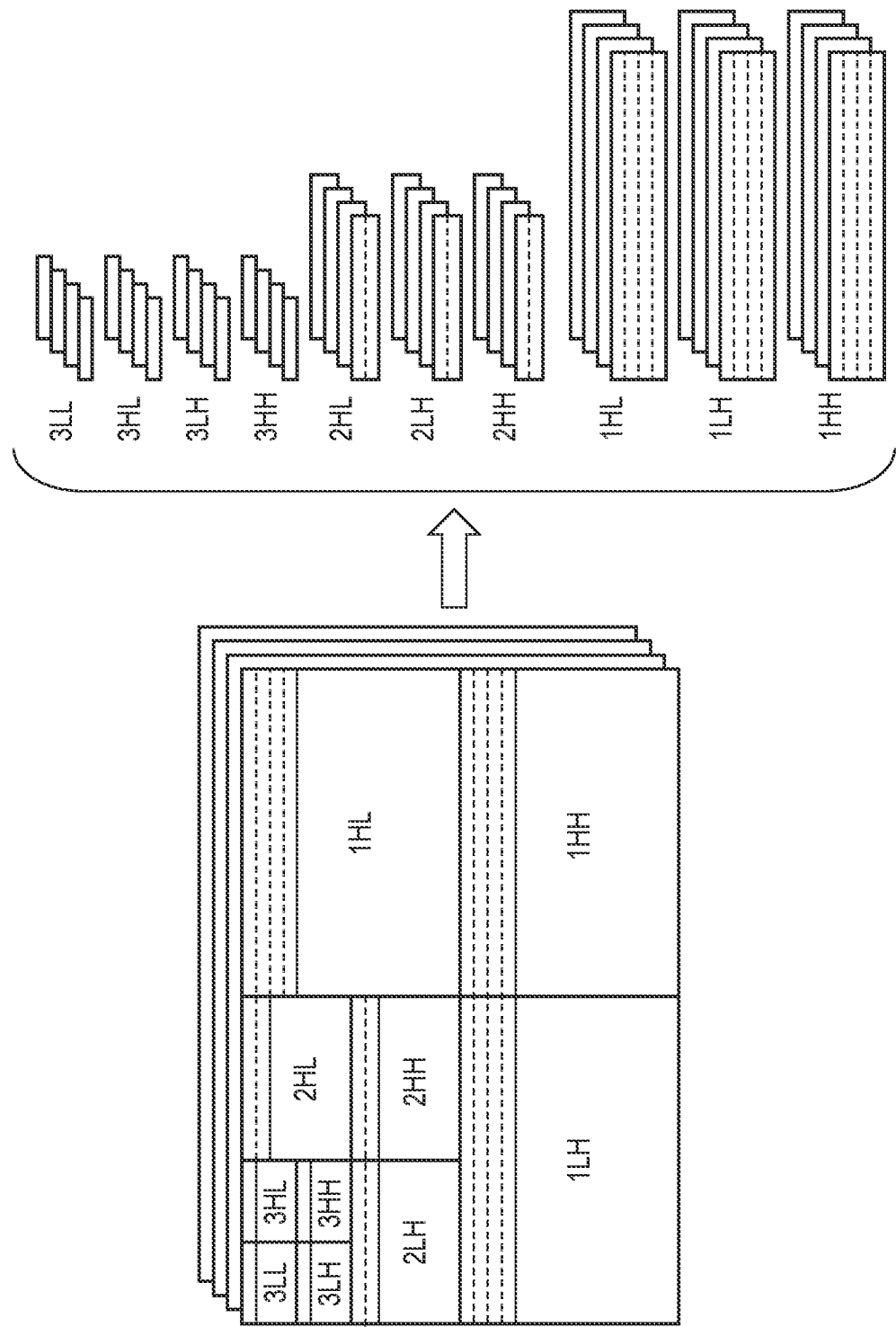
FIG. 5 is a diagram showing an example of a predictive encoding method according to an embodiment of the present invention.

FIG. 5 shows unit regions for controlling code amounts (for determining a quantization parameter) when discrete wavelet transform at lev=3 is applied to each channel data. Regarding subbands (3LL, 3HL, 3LH, 3HH) at the level 3, one piece of subband data in the vertical direction×N (N is an integer) pieces of subband data in the horizontal direction×all of the channels is set as a unit region. Regarding subbands (2HL, 2LH, 2HH) at the level 2, two pieces of subband data in the vertical direction×N pieces of subband data in the horizontal direction×all of the channels is set as a unit region. Regarding subbands (1HL, 1LH, 1HH) at the level 1, four pieces of subband data in the vertical direction×N pieces of subband data in the horizontal direction×all of the channels is set as a unit region.

The quantization parameter generation unit 103 compares a generated code amount with a target code amount determined in advance for a unit region to be encoded. The quantization parameter generation unit 103 then performs feedback control such that the generated code amount for the next unit region of the same type approximates the target code amount, and generates a quantization parameter (QpBr) for each unit region. Note that, when the generated code amount is not controlled, it is sufficient for the quantization parameter generation unit 103 to set or generate a quantization parameter (QpBr) common to all of the pieces of subband data for one screen.

Here, the quantization parameter generation unit 103 can adjust the generated quantization parameter (QpBr) from a viewpoint of image quality control. For example, the quantization parameter generation unit 103 can adjust the quantization parameter based on a result of evaluating subband data input by the frequency decomposition unit 102, in units of predetermined subband data. Accordingly, the quantization parameter generation unit 103 can generate a quantization parameter for realizing image quality control that is based on the property of RAW data. For example, the quantization parameter generation unit 103 can separate brightness regions in accordance with a low-frequency subband, and generate a quantization parameter for adjusting the level of quantization for each of the brightness regions.

Figure 6A:
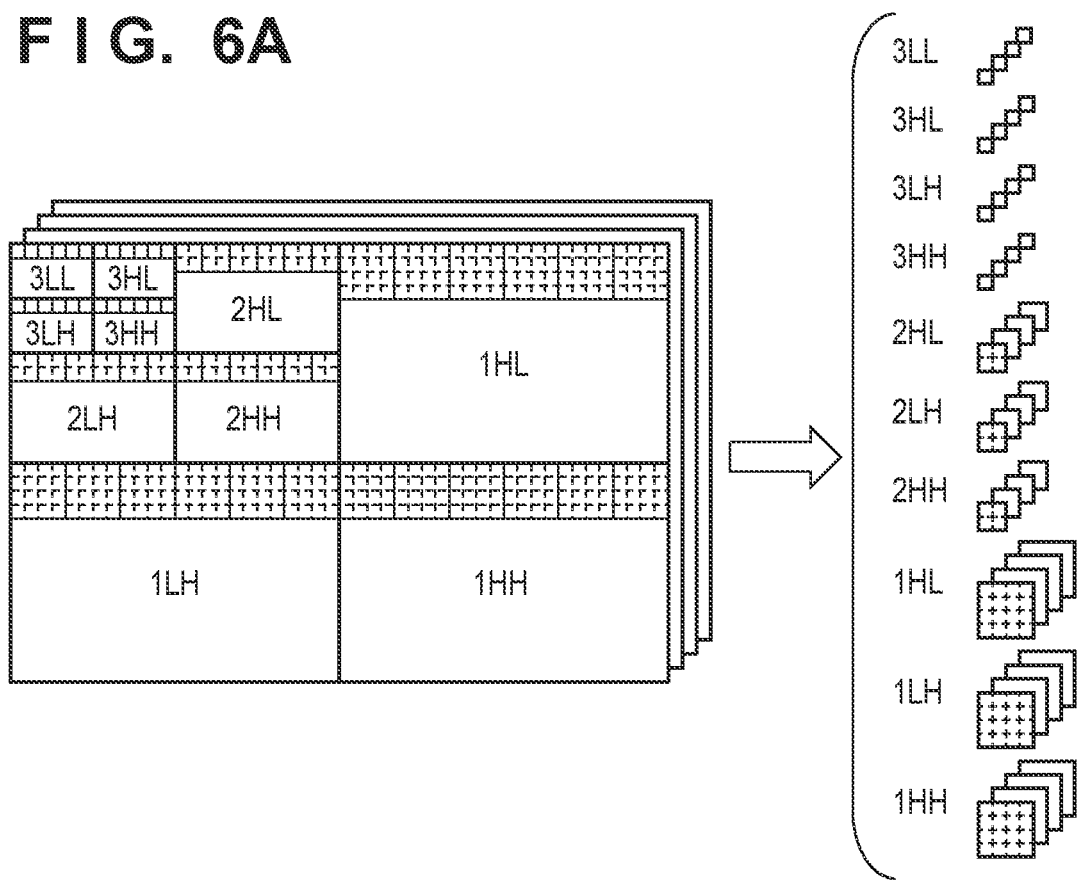
FIGS. 6A and 6B are diagrams showing examples of quantization control units related to code amount control according to an embodiment of the present invention.
Figure 6B:
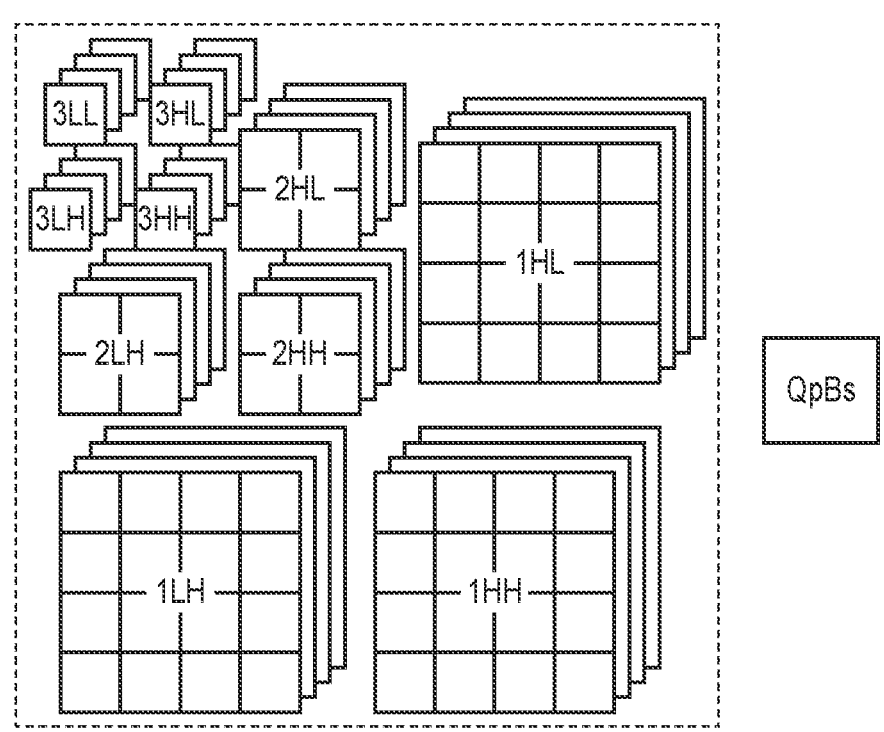

FIG. 6A shows unit regions for evaluating subband data regarding image quality control and updating the quantization parameter, when discrete wavelet transform of lev=3 is applied to each channel data. Regarding subbands (3LL, 3HL, 3LH, 3HH) at the level 3, one piece of subband data in the vertical direction×one piece of subband data in the horizontal direction×all of the channels is set as a unit region. Regarding subbands (2HL, 2LH, 2HH) at the level 2, two pieces of subband data in the vertical direction×two pieces of subband data in the horizontal direction×all of the channels is set as a unit region. Regarding subbands (1HL, 1LH, 1HH) at the level 1, four pieces of subband data in the vertical direction×four pieces of subband data in the horizontal direction×all of the channels is set as a unit region. The quantization parameter generation unit 103 generates a quantization parameter (QpBs) for each unit region. Therefore, the relationship between subband data and the quantization parameter (QpBs) related to image quality control is as shown in FIG. 6B. Note that unit regions are not limited to those shown in FIGS. 6A and 6B.

Evaluation of subband data related to image quality control can be performed as follows. The quantization parameter generation unit 103 evaluates the subband data of 3LL as a low-frequency components, and evaluates the subband data of 1HL, 1LH, and 1HH as high-frequency components, for example. The quantization parameter generation unit 103 then adjusts the quantization parameter (QpBr) generated through code amount control, such that the smaller the amplitude of the low-frequency component is, the more finely quantization is performed (the smaller the quantization parameter becomes). Also, the quantization parameter generation unit 103 adjusts the quantization parameter (QpBr) such that the larger the amplitude of high-frequency components is, the more roughly quantization is performed (the larger the quantization parameter becomes). Adjustment of the quantization parameter (QpBr) can be realized by adjusting a gain and offset through feed forward control, for example. Note that, when adjustment of the quantization parameter for the purpose of image quality control is not performed, the quantization parameter generation unit 103 can use the quantization parameter (QpBr) as an adjusted quantization parameter (QpBs) without any change.

As shown in FIG. 7, the quantization parameter (QpBs) generated as described above can be used for quantization of a region of 8×8 pixels×all of the channels, in other words, a region of 16×16 pixels of RAW data.

Next, the quantization parameter generation unit 103 generates a quantization parameter QpSb unique to each channel and each subband, from the quantization parameter QpBs common to all of the channels and all of the subbands, using Expression 4 below.

$$QpSb[i][j]=QpBs\times\alpha[i][j]+\beta[i][j] \qquad (4)$$

QpSb: quantization parameter unique to each channel and each subband
QpBs: quantization parameter common to all of the channels and all of the subbands
α: slope
β: intercept
i: channel index (in this embodiment, 0 to 3)
j: subband index (in this embodiment, 0 to 9)

The slope α and the intercept β are variables unique to a channel and a subband. Therefore, it is possible to perform flexible quantization control for each channel and each subband by adjusting the slope α and the intercept β.

The quantization unit 104 applies quantization processing that uses a quantization parameter supplied from the quantization parameter generation unit 103, on subband data (transform coefficients) supplied from the frequency decomposition unit 102. The quantization unit 104 outputs subband data subjected to quantization (transform coefficients), the quantization parameter (QpBs), and the slope α and the intercept β, to the entropy encoding unit 105.

Figure 8:
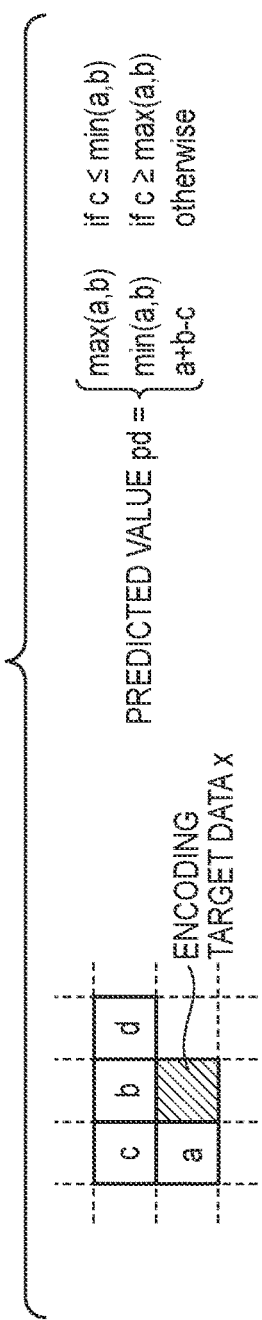
FIG. 8 is a diagram showing the relationship between quantization control units and RAW data according to an embodiment of the present invention.

The entropy encoding unit 105 performs prediction difference entropy encoding on subband data (transform coefficients) that has been subjected to quantization, and has been input from the quantization unit 104, for each subband in the raster scan order. For example, as shown in FIG. 8, the entropy encoding unit 105 generates a predicted value pd through MED (Median Edge Detection) prediction that is based on four pieces of subband data, namely subband data a, subband data b, subband data c, and subband data d positioned in the periphery of subband data x that is to be encoded. The entropy encoding unit 105 then encodes the difference between the value xd of the data x to be encoded and the predicted value pd (xd−pd), using an entropy encoding method.

A known entropy encoding method such as Huffman encoding or Golomb encoding can be used for the encoding.

Note that calculation of a predicted value and entropy encoding may be performed by another method. The entropy encoding unit 105 stores the quantization parameter (QpBs), the slope α and the intercept β, and information that makes it possible to specify a channel decomposition method of the channel decomposition unit 101, as metadata in a file for storing encoded RAW data, for example.

The entropy encoding unit 105 outputs the file storing encoded RAW data (encoded RAW data file) to the outside. The encoded RAW data file is recorded, for example, in a storage medium or a recording apparatus that can be accessed from an electronic device that includes the encoding apparatus 100, by the electronic apparatus. The entropy encoding unit 105 further notifies the quantization parameter generation unit 103 of generated code amounts in units of lines, for each piece of subband. As described above, the encoding apparatus 100 generates encoded data.

Description of Decoding Apparatus

Figure 9:
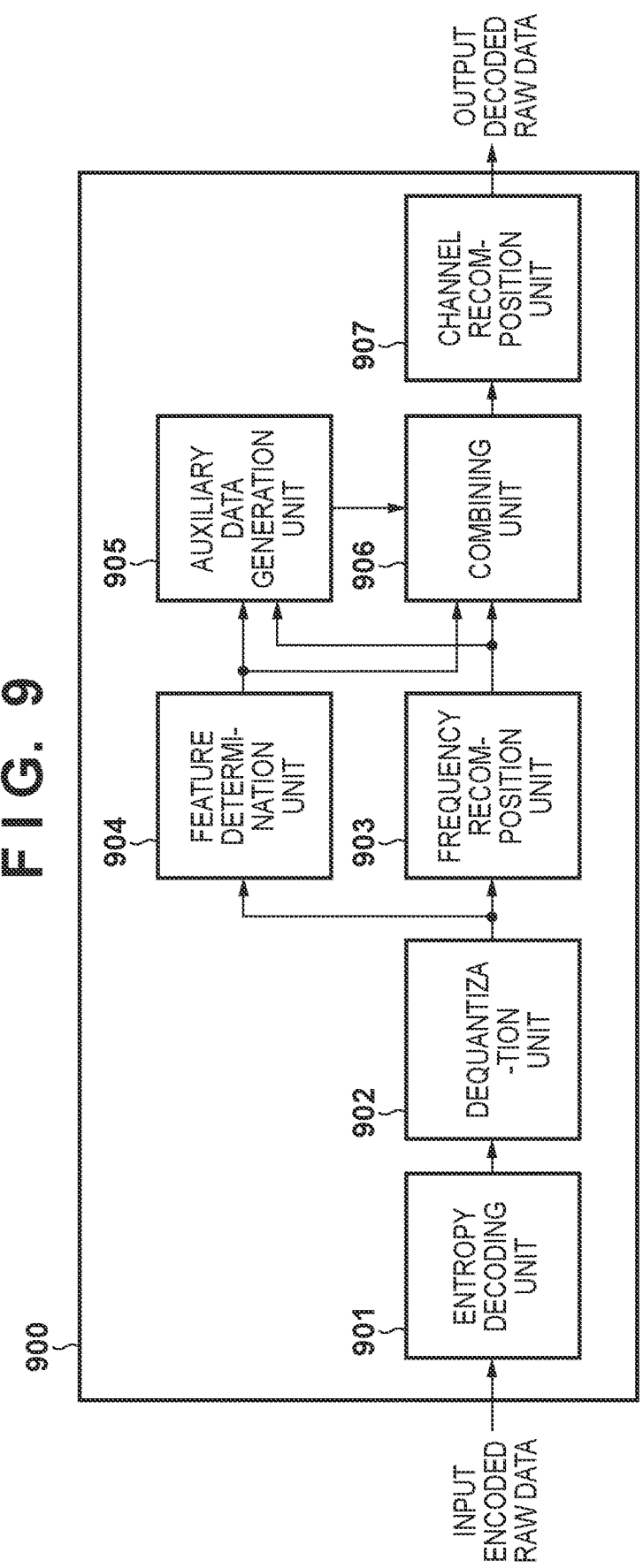
FIG. 9 is a block diagram showing a configuration example of a decoding apparatus according to an embodiment of the present invention.

Next, a decoding apparatus 900 that decodes encoded RAW data generated by the above-described method will be described with reference to the block diagram shown in FIG. 9. The decoding apparatus 900 includes an entropy decoding unit 901, a dequantization unit 902, a frequency recomposition unit 903, a feature determination unit 904, an auxiliary data generation unit 905, a combining unit 906, and a channel recomposition unit 907. These units (functional blocks) can be realized by a dedicated hardware circuit such as an ASIC, as a result of a general-purpose processor such as a DSP or a CPU loading a program stored in a non-volatile memory to a system memory and executing the program, or a combination thereof. For convenience, a description will be given below assuming that each functional block autonomously operates in cooperation with other functional blocks.

The entropy decoding unit 901 extracts encoded RAW data from an encoded RAW data file. At this time, the entropy decoding unit 901 also extracts information included as metadata, and supplies the information to other blocks. For example, the entropy decoding unit 901 supplies the quantization parameter (QpBs), and the slope α and the intercept β to the dequantization unit 902, and supplies the information that makes it possible to specify a channel decomposition method, to the channel recomposition unit 907. The entropy decoding unit 901 applies entropy decoding processing to the encoded RAW data, and obtains subband data (transform coefficients). The entropy decoding unit 901 supplies the obtained subband data (transform coefficients) to the dequantization unit 902.

The dequantization unit 902 generates a quantization parameter (QpSb) unique to each channel and each subband, based on the quantization parameter (QpBs), and the slope α and the intercept β supplied from the entropy decoding unit 901. The dequantization unit 902 then applies dequantization processing that uses the generated quantization parameter, to the subband data (transform coefficients) supplied from the entropy decoding unit 901. The dequantization unit 902 supplies the subband data subjected to dequantization (transform coefficients), to the frequency recomposition unit 903 and the feature determination unit 904.

The frequency recomposition unit 903 applies frequency recomposition processing to the subband data (transform coefficients) supplied from the dequantization unit 902, generates channel data, and supplies the generated channel data to the auxiliary data generation unit 905 and the combining unit 906.

The feature determination unit 904 performs feature determination using the subband data (transform coefficients) supplied from the dequantization unit 902, and specifies one of a plurality of predetermined classifications corresponding to the encoded RAW data. Operations of the feature determination unit 904 will be described with reference to the flowchart shown in FIG. 10A.

The feature determination unit 904 performs feature determination for subband data (transform coefficients) that is to be quantized using the quantization parameter (QpBs), and is shown in FIG. 6B, for each piece of channel data based on the subband data. The feature determination unit 904 performs feature determination that is based on brightness and complexity, for example, and specifies one classification corresponding to channel data from among a plurality of classifications corresponding to combinations of brightness and complexity. One or more items related to the magnitude or level of image quality deterioration caused by lossy encoding can be used as items for feature determination. As described above, image quality deterioration caused by lossy encoding (in this case, quantization) is likely to be conspicuous in a dark region and a plain region. Therefore, according to this embodiment, feature determination is performed using two items, namely brightness and complexity.

Here, assume that encoded RAW data is encoded data of subband data obtained as a result of applying discrete wavelet transform at lev=3 to each predetermined channel. In addition, for ease of description and understanding, brightness and complexity each have two stages. Specifically, as shown in FIG. 10B, brightness is classified into two stages, namely "bright" and "dark" using a brightness threshold value dcth. Also, complexity is classified into two stages, namely "complex" and "plain" using a complexity threshold value acth. Note that, for convenience, FIG. 10B indicates that the brightness threshold value dcth is positioned at the center of a brightness range, and the complexity threshold value acth is positioned at the center of the range of the ratio of AC component, but the threshold values do not need to be a median value between a minimum value and a maximum value. In addition, the number of items of classification is not limited to two, and may be three or more or one (for example, one of brightness and complexity). Furthermore, the number of divisions for each item is not limited to two, and may be three or more.

First, in step S1001, the feature determination unit 904 determines the brightness by comparing a transform coefficient coef (dc) of the subband 3LL that of a low-frequency component with the brightness threshold value dcth. If the transform coefficient coef (dc) is larger than or equal to the brightness threshold value dcth, the feature determination unit 904 determines that the brightness of the transform coefficient coef (dc) of the subband 3LL is "bright", and advances the procedure to step S1002. In addition, if the transform coefficient coef (dc) is smaller than the brightness threshold value dcth, the feature determination unit 904 determines that the brightness of the transform coefficient coef (dc) of the subband 3LL is "dark", and advances the procedure to step S1003.

In steps S1002 and S1003, the feature determination unit 904 determines the complexity by comparing a transform coefficient coef (ac) of the subband 1HH of a high-frequency component with the complexity threshold value acth. In the example shown in FIG. 6B, the number of transform coefficients coef (ac) of the subband data 1HH is 16, and thus, here, the average value of the transform coefficients is compared with the complexity threshold value acth.

If (the average value of) the transform coefficients coef (ac) is larger than or equal to the complexity threshold value acth, the feature determination unit 904 determines that the complexity of the transform coefficients coef (ac) of the subband 1HH is "complexed", and advances the procedure to step S1004 or step S1006. In addition, if (the average value of) the transform coefficients coef (ac) is smaller than the complexity threshold value acth, the feature determination unit 904 determines that the complexity of the transform coefficients coef (ac) of the subband 1HH is "plain", and advances the procedure to step S1005 or S1007.

In step S1004, the feature determination unit 904 determines that a classification corresponding to channel data subjected to subband evaluation is "bright and complex", and ends the determination processing.

In step S1005, the feature determination unit 904 determines that a classification corresponding to channel data subjected to subband evaluation is "bright and plain", and ends the determination processing.

In step S1006, the feature determination unit 904 determines that a classification corresponding to channel data subjected to subband evaluation is "dark and complex", and ends the determination processing.

In step S1007, the feature determination unit 904 determines that a classification corresponding to channel data subjected to subband evaluation is "dark and plain", and ends the determination processing.

The feature determination unit 904 executes the processing shown in FIG. 10A for each piece of channel data, and supplies classification information indicating the classification in the determination result, to the auxiliary data generation unit 905 and the combining unit 906.

Figure 11A:
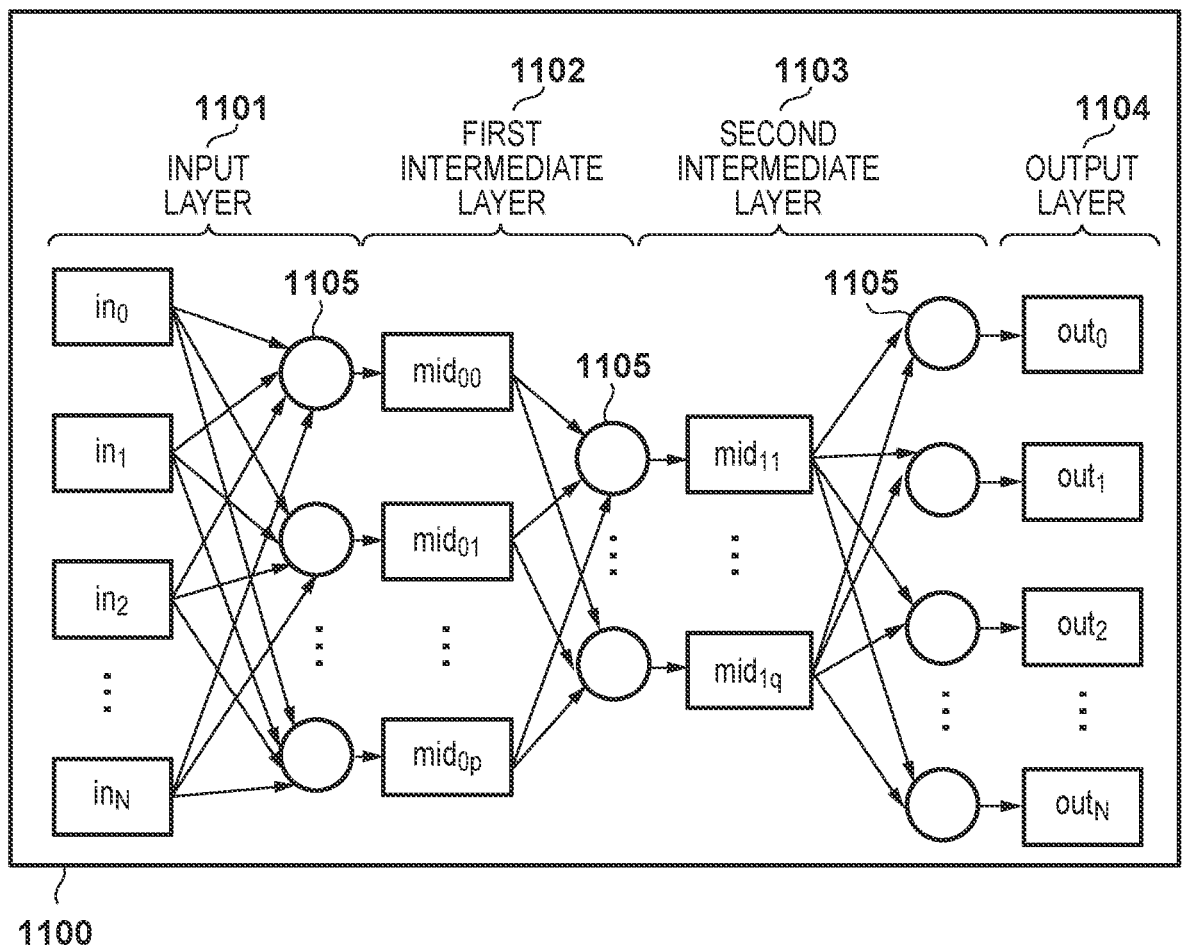
FIGS. 11A to 11D are diagrams showing configuration examples of a correction data generation unit according to an embodiment of the present invention.

The auxiliary data generation unit 905 is an inference processing unit that generates or obtains, for each piece of channel data, auxiliary data (correction data) for correcting decoded data using a neural network to which learned inference parameters for the respective classifications are applied. FIG. 11A shows a configuration example of a neural network 1100 that can be used by the auxiliary data generation unit 905.

The neural network 1100 includes four layers, namely an input layer 1101, a first intermediate layer 1102, a second intermediate layer 1103, and an output layer 1104, and those layers are connected by neurons 1105. The neurons 1105 have a configuration shown in FIG. 11B, and obtain x' based on input values $x_1$ to $x_N$, weights $w_1$ to $w_N$, and a bias b as indicated by Expression 5.

$$x' = \Sigma_{n=1}^{N}(x_n \cdot w_n) + b \tag{5}$$

The weights $w_1$ to $w_N$ and the bias b that are respectively applied to the neurons 1105 are prepared in advance as learned inference parameters corresponding to classification information. Specifically, the inference parameters are obtained by individually performing training, with respect to classifications similar to those used by the feature determination unit 904, for each classification using RAW data to be encoded as training data. Note that inference parameters are also prepared in advance for the neurons 1105 of the first intermediate layer 1102 and the second intermediate layer 1103 similarly. In FIG. 11A, the number of neurons of the first intermediate layer 1102 is smaller than N, but this is only exemplary, and the number of neurons in an intermediate layer may be larger than or equal to N.

Figure 11B:
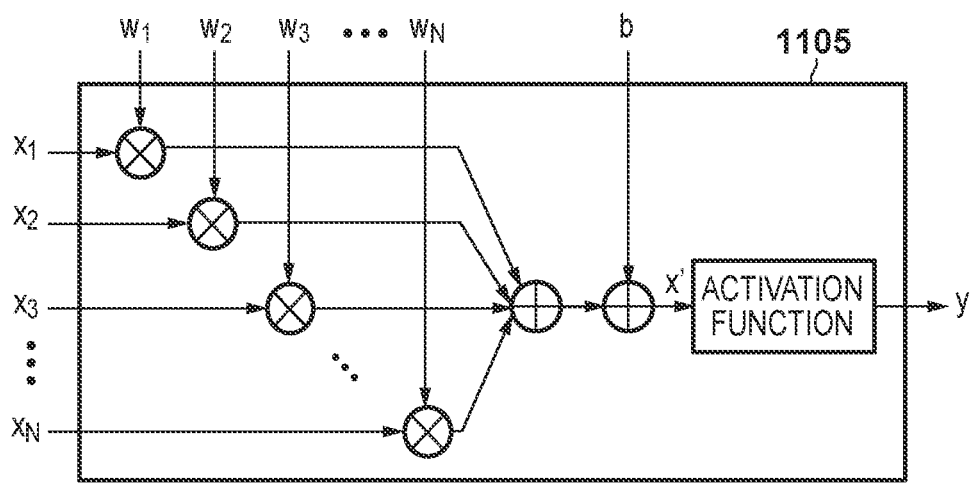
Figure 11C:
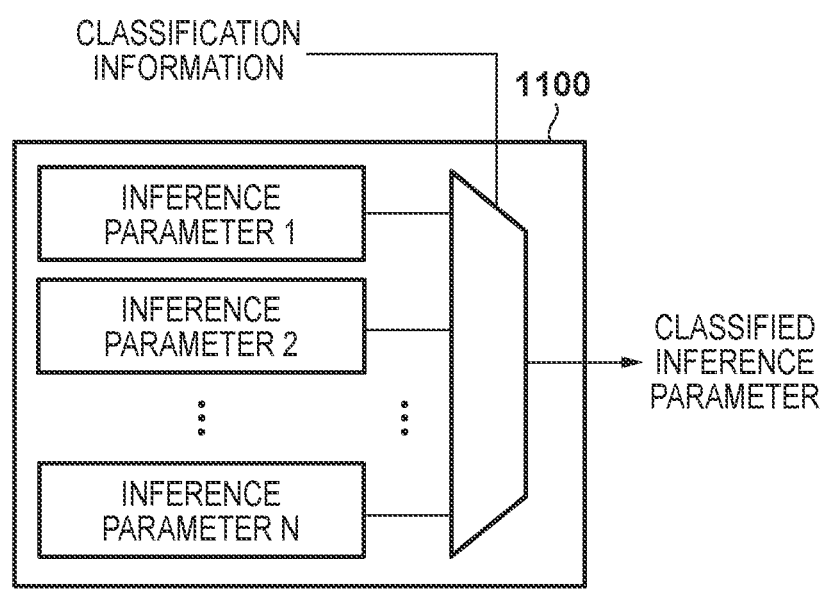
Figure 11D:
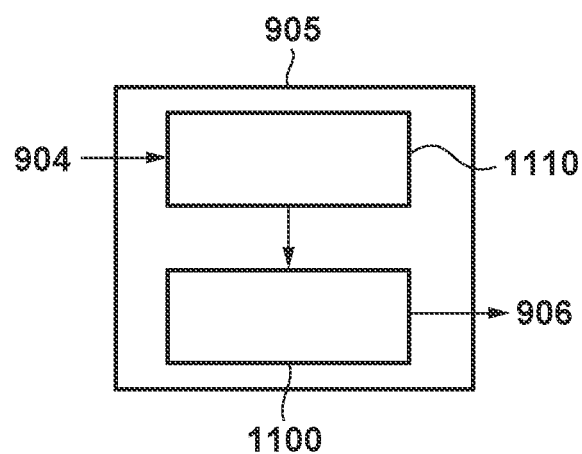

The auxiliary data generation unit 905 includes a parameter selection unit 1110 as shown in FIG. 11C. As shown in FIG. 11D, the parameter selection unit 1110 selects one of a plurality of classified inference parameters prepared in advance based on classification information supplied from the feature determination unit 904, and supplies the selected parameter to the neural network 1100. Note that a configuration may also be adopted in which classified inference parameters can be updated from the outside of the auxiliary data generation unit 905.

The neurons 1105 input x' obtained using Expression 5 to an activation function such as a sigmoid function (Expression 6) that is a non-linear function, or a ramp function (Expression 7), and outputs y.

$$y = 1/(1 + e^{-x'}) \tag{6}$$

$$y = 0(x' \leq 0), y = x'(x' > 0) \tag{7}$$

Note that the configurations of the neural network 1100 and neurons 1105 are not limited to those shown in FIGS. 11A and 11B. As a result of inputting channel data to the input layer 1101 of the neural network 1100, data passes through the first intermediate layer 1102 and the second intermediate layer 1103, and auxiliary data for correcting encoding deterioration is finally obtained from the output layer 1104. The auxiliary data generation unit 905 supplies the auxiliary data to the combining unit 906.

The combining unit 906 selects a combining ratio corresponding to a classification result that is input from the feature determination unit 904, from classified combining ratios prepared in advance. The combining unit 906 then corrects channel data by combining channel data input from the frequency recomposition unit 903 and auxiliary data input from the auxiliary data generation unit 905, based on the selected combining ratio. The combining unit 906 generates corrected channel data. A configuration may also be adopted in which a combining ratio can be set by the user such that the user can adjust the correction intensity in accordance with a classification. In addition, the combining ratio may also be common to all of the classifications. The combining unit 906 outputs the corrected channel data to the channel recomposition unit 907.

The channel recomposition unit 907 decodes corrected channel data for one screen input from the combining unit 906, into RAW data in the Bayer array for one screen (channel recomposition). Processing of the channel recomposition unit 907 is reverse processing of the processing of the channel decomposition unit 101 of the encoding apparatus 100. Note that, if the channel decomposition method is not known, information that makes it possible to specify a channel decomposition method is stored as metadata in the data file for storing encoded RAW data, during encoding. The channel recomposition unit 907 then performs channel recomposition based on this information. The information that makes it possible to specify a channel decomposition method may also be supplied to the channel recomposition unit 907 by the entropy decoding unit 901.

When decoding encoded RAW data obtained through lossy encoding of subband data, the decoding apparatus according to this embodiment specifies one classification that corresponds to the RAW data, from among a plurality of classifications determined in advance in accordance with features of an image, based on the subband data. The features can be one or more items regarding image quality deterioration caused by lossy encoding and affecting visibility, such as brightness and complexity of the image. The decoding apparatus then corrects the RAW data using correction data that is based on the classification result. The correction data is inference parameters learned for respective classifications, for example. Accordingly, it is possible to appropriately correct deterioration in the image quality caused by lossy encoding, in accordance with features of an image, and improve the quality of decoded RAW data.

Second Embodiment

Next, a second embodiment of the present invention will be described. A decoding apparatus according to this embodiment is similar to that in the first embodiment except for operations of the feature determination unit 904. Therefore, the operations of the feature determination unit 904 according to this embodiment will be described mainly below.

FIG. 12 is a flowchart related to the operations of the feature determination unit 904 according to this embodiment. The feature determination unit 904 classifies subband data into four types shown in FIG. 10B in terms of brightness and complexity similarly to the first embodiment, and then further classifies the subband data into two types in accordance with a quantization parameter. Therefore, the feature determination unit 904 according to this embodiment classifies channel data into eight types. Note that, also according to this embodiment, the types of items of classification, the number of items, and a number of divisions for each item are only exemplary.

The processes in steps S1201 to S1203 are similar to those in steps S1001 to S1003 in FIG. 10A, and a description thereof is omitted.

In steps S1204 to S1207, the feature determination unit 904 compares the quantization parameter (QpBs) with a quantization parameter threshold value Qth, and determines a quantization range. If the quantization parameter is larger than or equal to Qth, the feature determination unit 904 advances the procedure to steps S1208, S1210, S1212, and S1214, respectively, and if the quantization parameter is smaller than Qth, the feature determination unit 904 advances the procedure to steps S1209, S1211, S1213, and S1215, respectively.

In step S1208, the feature determination unit 904 classifies channel data subjected to subband evaluation, into "bright and complex 1", and ends the determination processing.

In step S1209, the feature determination unit 904 classifies channel data subjected to subband evaluation into "bright and complex 2", and ends the determination processing.

In step S1210, the feature determination unit 904 classifies channel data subjected to subband evaluation into "bright and plain 1", and ends the determination processing.

In step S1211, the feature determination unit 904 classifies channel data subjected to subband evaluation into "bright and plain 2", and ends the determination processing.

In step S1212, the feature determination unit 904 classifies channel data subjected to subband evaluation into "dark and complex 1", and ends the determination processing.

In step S1213, the feature determination unit 904 classifies channel data subjected to subband evaluation into "dark and complex 2", and ends the determination processing.

In step S1214, the feature determination unit 904 classifies channel data subjected to subband evaluation into "dark and plain 1", and ends the determination processing.

In step S1215, the feature determination unit 904 classifies channel data subjected to subband evaluation into "dark and plain 2", and ends the determination processing.

When the quantization parameter is variable, a larger quantization parameter is usually used for a plainer region. Therefore, the quantization parameter is an item related to complexity. It is conceivable that the complexity when the quantization parameter (QpBs) is smaller than Qth is higher than the complexity when the quantization parameter (QpBs) is larger than or equal to Qth.

Note that, according to this embodiment, inference parameters corresponding to the eight classifications are prepared for the parameter selection unit 1110 of the auxiliary data generation unit 905. Accordingly, channel data can be corrected using appropriate inference parameters in accordance with a result of classification performed by the feature determination unit 904.

As described above, according to this embodiment, in addition to the effect of the first embodiment, subband data can be corrected in consideration of image quality deterioration caused by the magnitude of a quantization parameter in addition to features of an image, by classifying channel data by magnitude of the quantization parameter as well.

OTHER EMBODIMENTS

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-194728, filed on Oct. 25, 2019, which is hereby incorporated by reference herein in its entirety.

What is claimed is:

1. An image processing apparatus comprising:
   one or more processors that execute a program comprising instructions that cause, when executed by the one or more processors, the one or more processors to function as:
   a decoding unit configured to decode encoded RAW data that includes subband data being encoded with lossy encoding scheme;

a determination unit configured to determine one of a plurality of classifications based on the decoded subband data, the plurality of classifications being based on a feature of an image, wherein the plurality of classifications are classifications in terms of at least one of brightness and complexity of an image;

an obtaining unit configured to obtain correction data corresponding to the determined classification; and a correction unit configured to correct recomposed data, which is obtained by applying frequency recomposition to the decoded subband data, based on the correction data, in order to obtain the corrected data as decoded RAW data.

2. The image processing apparatus according to claim 1, wherein the obtaining unit obtains the correction data through inference processing that uses the recomposed data and an inference parameter corresponding to the determined classification.

3. The image processing apparatus according to claim 2, wherein the obtaining unit obtains the correction data using a neural network that uses the recomposed data as input, and that uses the inference parameter corresponding to the determined classification a weight of a neuron.

4. The image processing apparatus according to claim 1, wherein the correction unit corrects the recomposed data, by combining the recomposed data and the correction data based on a combining ratio.

5. The image processing apparatus according to claim 4, wherein the combining ratio is based on the determined classification.

6. The image processing apparatus according to claim 4, wherein the combining ratio is set by a user.

7. The image processing apparatus according to claim 1, wherein the determination unit determines one of the plurality of classifications, based on at least one of subband data of a low-frequency component and subband data of a high-frequency component that are comprised in the subband data.

8. The image processing apparatus according to claim 1, wherein the lossy encoding includes quantization, and the plurality of classifications are classifications in terms of a quantization parameter used for the quantization in addition to at least one of brightness and complexity of an image.

9. An image processing method that is executed by an image processing apparatus, the method comprising:

decoding encoded RAW data that includes subband data being encoded with lossy encoding scheme;

determining one of a plurality of classifications based on the decoded subband data, the plurality of classifications being based on a feature of an image, wherein the plurality of classifications are classifications in terms of at least one of brightness and complexity of an image;

obtaining correction data corresponding to the determined classification; and correcting recomposed data, which is obtained by applying frequency recomposition to the decoded subband data, based on the correction data, in order to obtain the corrected data as decoded RAW data.

10. A non-transitory computer-readable medium that stores a program for causing a computer to function as an image processing apparatus comprising:

a decoding unit configured to decode encoded RAW data that includes subband data being encoded with lossy encoding scheme;

a determination unit configured to determine one of a plurality of classifications based on the decoded subband data, the plurality of classifications being based on a feature of an image, wherein the plurality of classifications are classifications in terms of at least one of brightness and complexity of an image;

an obtaining unit configured to obtain correction data corresponding to the determined classification; and a correction unit configured to correct recomposed data, which is obtained by applying frequency recomposition to the decoded subband data, based on the correction data, in order to obtain the corrected data as decoded RAW data.

* * * * *